United States Patent [19]

Decker

[11] 4,183,378
[45] Jan. 15, 1980

[54] LIGHT WEIGHT VACUUM MAINTAINED STRUCTURES

[76] Inventor: Bert J. Decker, 136 Capen Blvd., Buffalo, N.Y. 14226

[21] Appl. No.: 752,728

[22] Filed: Dec. 21, 1976

[51] Int. Cl.² ............................ F16L 9/18; F16L 9/22
[52] U.S. Cl. ..................................... 138/149; 138/148; 138/155; 220/468
[58] Field of Search ...................... 138/148, 149, 155; 220/9, 9 C; 156/287; 52/2; 428/12, 36, 33, 188

[56] References Cited

U.S. PATENT DOCUMENTS

| | | | |
|---|---|---|---|
| 2,642,883 | 6/1953 | Hasselquist | 52/2 |
| 2,850,026 | 9/1958 | Leathermon | 52/2 |
| 2,863,179 | 12/1958 | Gaugler | 220/9 C |
| 2,924,245 | 2/1960 | Wilson | 138/149 |
| 3,095,014 | 6/1963 | Dosken | 138/149 |
| 3,675,377 | 7/1972 | Suter | 428/12 |
| 3,809,128 | 5/1974 | Tateisi et al. | 138/148 |
| 3,903,931 | 9/1975 | Moulin | 138/148 |
| 3,973,363 | 8/1976 | La Porte et al. | 52/2 |
| 4,016,702 | 4/1977 | Nakada et al. | 52/2 X |
| 4,063,573 | 12/1977 | Harting et al. | 138/155 |

FOREIGN PATENT DOCUMENTS 561296 5/1944 United Kingdom ..................... 138/148

*Primary Examiner*—Richard E. Aegerter
*Assistant Examiner*—James E. Bryant, III
*Attorney, Agent, or Firm*—Raymond F. Kramer

[57] ABSTRACT

A light weight vacuum maintained structure, especially useful when cylindrical, includes a plurality of hollow wall members made of a thin, normally flexible material and internally pressurized so as to be form-retaining, preferably of keystone-like shape, which are positioned with respect to each other so as to form an external wall of such structure, exposed to atmospheric pressure, with a vacuum in the interior of the structure, the difference in pressure holding the wall members together to seal off the interior of the structure and prevent loss of vacuum. In preferred embodiments of the invention the invented structure is employed: about piping to insulate it; in a dirigible, especially in a wind turbine-electric generator-containing dirigible, wherein the wall members may be pressurized with helium to increase buoyancy; and in a water distillation apparatus wherein a transporting section of such apparatus is of such structure, and a vacuum therein, which may be created by condensation of water vapor in a condenser, facilitates transportation of the water vapor through the transporting section and lifts water from a body of water to be evaporated to a height in an evaporating section at which the sun may shine on it and at which solar energy promotes vaporization.

5 Claims, 7 Drawing Figures

U.S. Patent  Jan. 15, 1980  Sheet 1 of 4  4,183,378
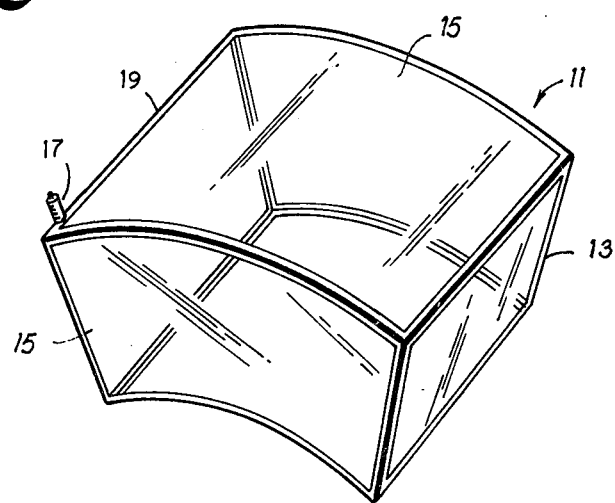
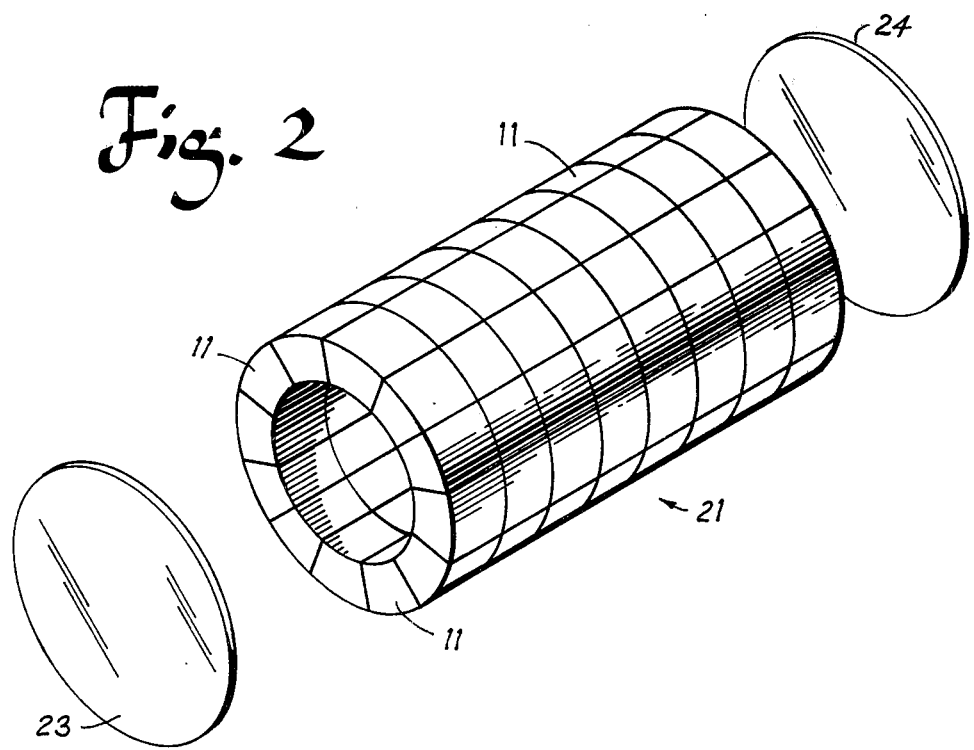

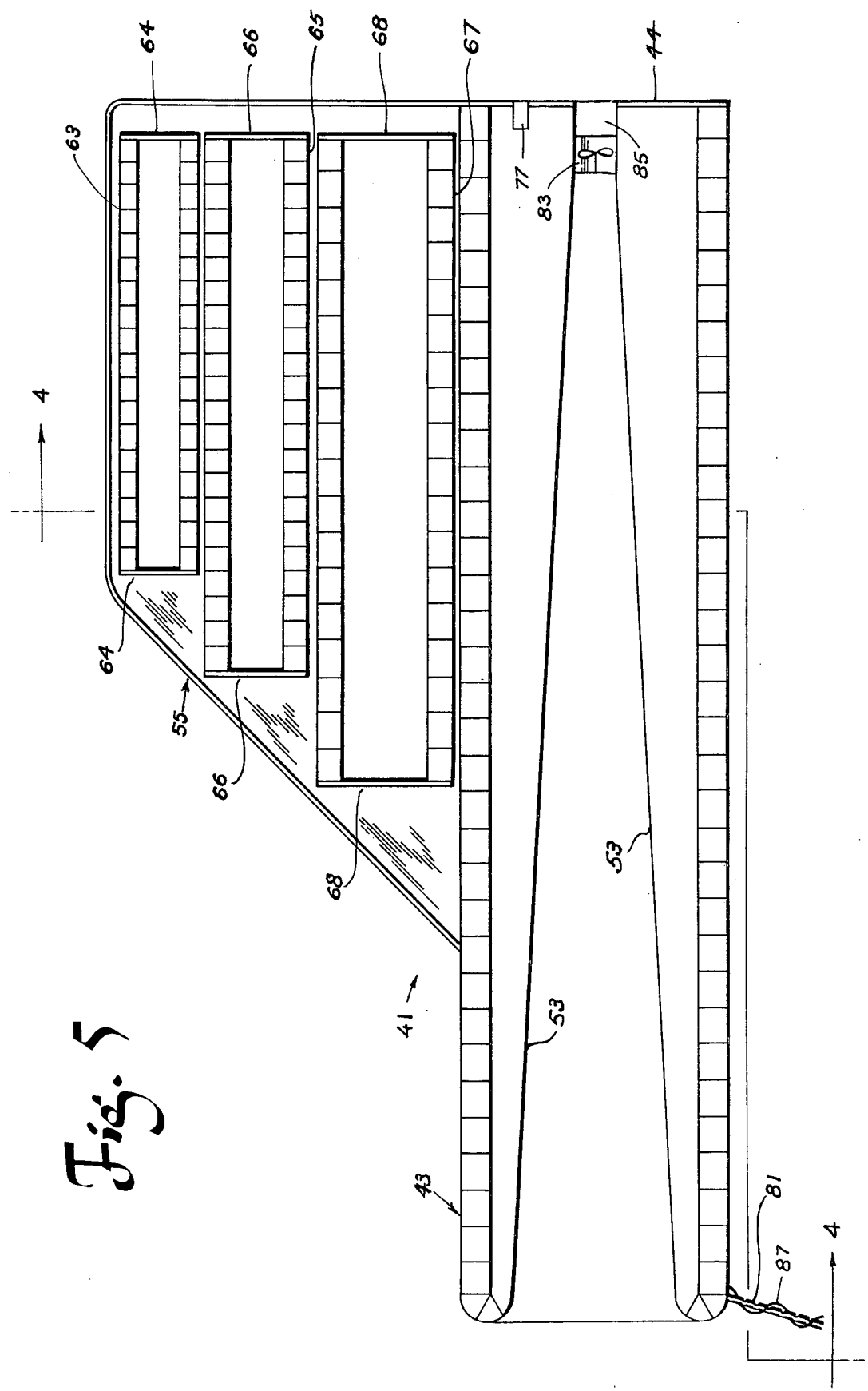

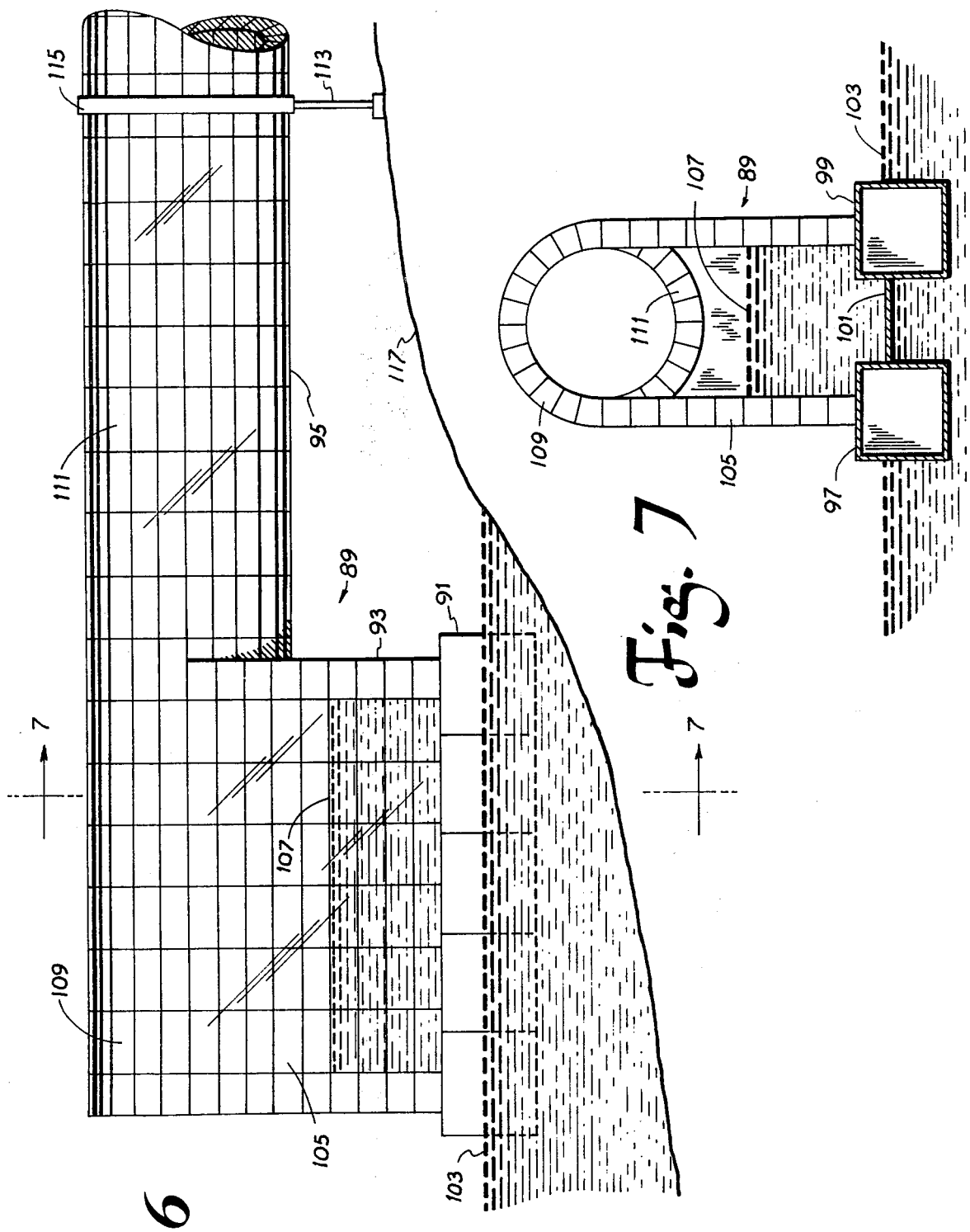

LIGHT WEIGHT VACUUM MAINTAINED STRUCTURES

This invention relates to light weight structures. More particularly, it is of such structures wherein a plurality of hollow wall members of thin, normally flexible material are internally pressurized so as to be form-retaining and are at least partially held in the desired form of a wall of such a structure by a vacuum in the interior of the structure.

Vacuum-containing structures, including pipes and tanks, have been made of comparatively thick, strong metals and have often been internally reinforced to protect against collapse due to external atmospheric pressure thereon. Gases which are lighter than air, such as helium and hot air, have been used to fill closed rigid and non-rigid structures so as to make them buoyant but vacuum has not been successfully employed, probably due to the excessive weight of a structure which would normally be required to withstand the force of atmospheric pressure on the structure. Structural units which are internally pressurized containers made of normally flexible material have been suggested for use as parts of light weight structural members. However, before the present invention it is not thought that any light weight structure, preferably in cylindrical form, was disclosed which was made of a plurality of internally pressurized wall members of thin, normally flexible material, pressurized to be form-retaining and preferably keystone-like in shape, and so positioned with respect to other wall members of such structure that a vacuum in the interior of the structure would hold or tend to hold them together due to atmospheric pressure, whereby the interior of the structure, under such vacuum, could thus be sealed. Furthermore, it is not thought that any such structures have been employed to vacuum insulate piping, or form walls of dirigibles, parts of buoyant wind turbines and turbine-generator structures or portions of buoyant or airborne distillation apparatuses. The most relevant references known to the applicant are: U.S. Pat. Nos. 511,472; 2,655,369; 3,213,628; 3,390,451; 3,596,622; and 3,716,953; and British Pat. Nos. 693,423; and 693,467.

In accordance with the present invention a light weight vacuum maintained structure comprises a plurality of wall members of thin normally flexible material internally pressurized so as to be form retaining and so positioned with respect to each other that upon application of a vacuum to the interior of such structure, they are held together by atmospheric pressure to help seal off the interior of such structure, which is under at least a partial vacuum. In preferred embodiments of the invention the structure is in the form of a hollow cylinder and the wall members are hollow and of keystone-like shape. In other aspects of the invention such structures are employed: to insulate pipes; in dirigibles; in dirigible-wind turbine-electric generator apparatuses; and in water distillation apparatuses.

The invention will be readily understood from reference to this specification, especially the following description, taken in conjunction with the drawing, in which:

FIG. 1 is an isometric view of a keystone-like shaped internally pressurized wall member utilized in this invention;

FIG. 2 is a disassembled isometric view of a hollow cylinder of this invention, made up of a plurality of the keystone-like wall members of FIG. 1, with ends removed;

FIG. 5 is a vertical sectional view of the dirigible-wind turbine-electric generator, along plane 5—5, like that of FIG. 4;

FIG. 6 is a side elevational view of a water distillation apparatus of this invention, utilizing a light weight vacuum maintained cylinder for transport of water vapor from the evaporator portion thereof to condensing means; and FIG. 7 is a sectional view along plane 7—7 of FIG. 6.

Figure 3:
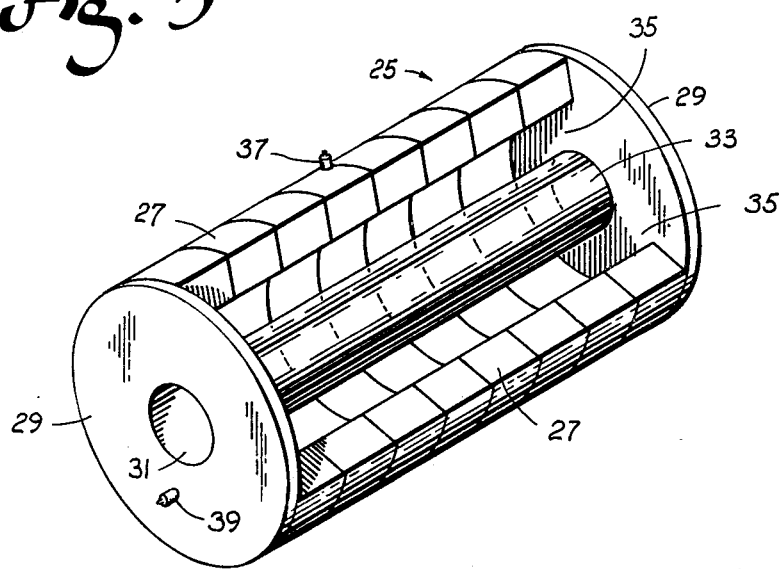
FIG. 3 is an isometric view of a pipe surrounded and insulated by a structure of the present invention, with a part of a wall of said structure being removed to better illustrate the invention.

In FIG. 1 wall member 11, of keystone-like shape or form (really being of a transverse cross-section of modified trapezoidal shape, with the base and smaller opposite side thereof being arcs of a circle whose center is at the intersection of the extensions of the sides of the trapezoid) is composed of a framework 13 and walls 15, within and held to the framework in gas-tight relationship. As illustrated, the wall member has been placed under internal pressure and "expanded" to the size and shape shown. Such wall members may be transparent or opaque or partially transparent and partially opaque as best suits the purpose for which they and the lightweight vacuum maintained structure made from them are intended. The pressurizing means, a fluid inside the completely enclosed wall member, is a gas, preferably air, nitrogen or helium but other gases may also be employed. Conventional valve means 17 are shown on an outer portion 19 of frame 13, through which the pressurizing gas may be added or vented. Of course, the wall member employed, which, or the parts of which, may be of any suitable material, such as rubbers, synthetic organic polymeric plastics, metals, metals alloys and fabrics, will usually be one which is gas-tight or if there should be any leakage through such wall member of gas, especially of the very light gases, such as helium (or hydrogen), such will be at a sufficiently slow rate that the pressure will be readily maintainable in the designed application of the structure.

The wall member illustrated in FIG. 1 is one which is thin and the material thereof is normally expansible or flexible or at least a sufficient part of it is so that the wall member itself can be changed from one of a relatively small volume to one of a relatively great volume by internal pressurization. Although the wall member illustrated in FIG. 1 is of a tranverse cross-sectional shape corresponding to a circumferential partial sector of a circle (the longitudinal cross-sectional shape thereof is usually rectangular) other shapes may also be employed, such as trapezoids, triangles, rectangles, circles, ellipses, other regular and irregular polygons and other closed curves, etc., providing that they can be drawn together or held together or such drawing or holding can be assisted by formation of the wall members into a structure and application of vacuum in the interior thereof to cause atmospheric pressure or other pressure greater than the absolute pressure of the vacuum to draw or hold them together or aid in doing so so as to seal off or assist in sealing off the interior of the structure to prevent loss of vacuum and to maintain the shape of the structure. The surfaces of the wall members may be shaped to interconnect to promote sealing between them.

The wall members of FIG. 1 are shown in FIG. 2 arranged circumferentially and longitudinally to form a light weight vacuum maintained cylindrical structure 21. Such wall members, while very preferably flexible or elastomeric, may be form-retaining without internal pressure but such pressure helps to prevent collapse when the exteriors thereof are subjected to vacuum. The structure shown is a hollow cylinder having at the front and back thereof thin but form-retaining sealing plates 23 and 24, respectively, of relatively light weight solid synthetic organic polymeric plastic, such as polymethyl methacrylate, in disc form. In appropriate circumstances such ends may also be pressurized plastic material in disc-like shape. In another aspect of the invention front and back plates 23 and 24 are replaced by closed convex hemispherical ends wherein wall members like those of FIG. 1 but modified so as to be frustopyramidal in shape (the outer and inner surfaces are preferably curved, as in the structure of FIG. 1) to form a vacuum maintained hemispherical end portion sealing against the wall members at the back end of cylinder 21. The vacuum inside the cylinder draws the various component wall members together and holds them or helps to hold them in gas-tight contact so that the vacuum is maintained. Although in many instances it is not necessary, it may often be desirable to utilize relatively thin and light weight sleeves externally and internally of the vacuum maintained structure so as to assist in positioning the multiplicity of wall members normally employed. Of course, such internal sleeves will be screens or will be perforated or otherwise have suitable openings therein so as to permit the vacuum to be transmitted to the exteriors of the wall members. At least a few such perforations or openings should be provided in any such external sleeve too so that atmospheric pressure may be transmitted to the structure exterior.

From the foregoing description of the invention it is seen that it is of a light weight vacuum maintained hollow cylindrical structure comprising: a plurality of separate hollow members, the walls of said members being of thin, normally flexible material, which members are internally gas pressurized so as to have such gas apply forces against interiors of the walls thereof to press them outwardly and maintain the members in desired form, the members being positioned with respect to each other, with walls of adjacent hollow members being in contact with each other, to form a cylinder; means for sealing off the ends of the cylinder under an internal pressure which is less than an external pressure on the hollow cylindrical structure so that the separate walled hollow members are held together by the external pressure to help seal off the hollow interior of such structure; and gas in the interior of the cylindrical structure and gas external to such structure, with the pressure in the interior being less than atmospheric and that external to the structure being greater than that in the structure interior.

An application of the invention is illustrated in FIG. 3, wherein hollow cylinder 25 is made up of wall members 27, which may be referred to as keystones, and has end members 29 joined to the end keystones in gas-tight contact. End members 29 are hollow flanges, having openings 31 therein, with internal, usually rigid or fairly rigid piping 33 joined to said flanges. A vacuum will be drawn on the volume 35 between said piping and the wall members. A plurality of units like that of FIG. 3 may be assembled together longitudinally, often with elimination of one of the two ends that would otherwise be in contact with each other, to construct longer vacuum-insulated piping or to make larger vacuum maintained structures. In such cases, the "end" flanges will in effect perform the function of spacers, holding the keystone away from contact from the internal pipe. When, as in the illustration, the piping is intended to be insulated by the surrounding vacuum, as when it is employed to transport steam or other condensable gas, the piping will preferably be of non-conductive material, e.g., fiber glass reinforced polyester, polyvinyl chloride or glass, and the ends of the structure and the external surfaces of the keystones will preferably be aluminized or covered or coated with reflective paint or sheathing. As in FIG. 1, the end portions and the intermediate spacers may be of internally pressurized normally flexible materials of desired expanded shapes. A similar structure is useful when the piping is used for the transport of refrigerants or other cold materials.

As in FIGS. 1 and 2, valve means are provided for access to the interiors of the wall members (valve 37) and to the structure interior (valve 39). Although not illustrated in FIG. 3 or in FIG. 2 it is also within the invention to make a light weight vacuum maintained structure wherein the vacuum is external to the structure or to at least part thereof. Thus, in FIG. 3 pipe 33 may be made of suitably shaped wall members with parts thereof that may be sealed or locked together when the members are drawn outwardly by application of vacuum. Such may not be the common case and specially designed wall members that interlock when expanded may have to be employed in the most practicable structures, but such structures are feasible. In a similar vein, in other aspects of the invention portions of cylinders or other shapes may be the structures composed of various pressurized wall members maintained in shape by vacuum. For example, such may be employed for making buildings, on the order of Quonset huts, of light weight materials and holding them in position or may be used for circular stadia, as when hemispherical structures are produced utilizing a light weight roof made up of internally pressurized wall members held in position by a partial vacuum in the enclosed or covered area. The vacuums referred to in this description are normally partial vacuums, the extent of which will be recited later.

Figure 4:
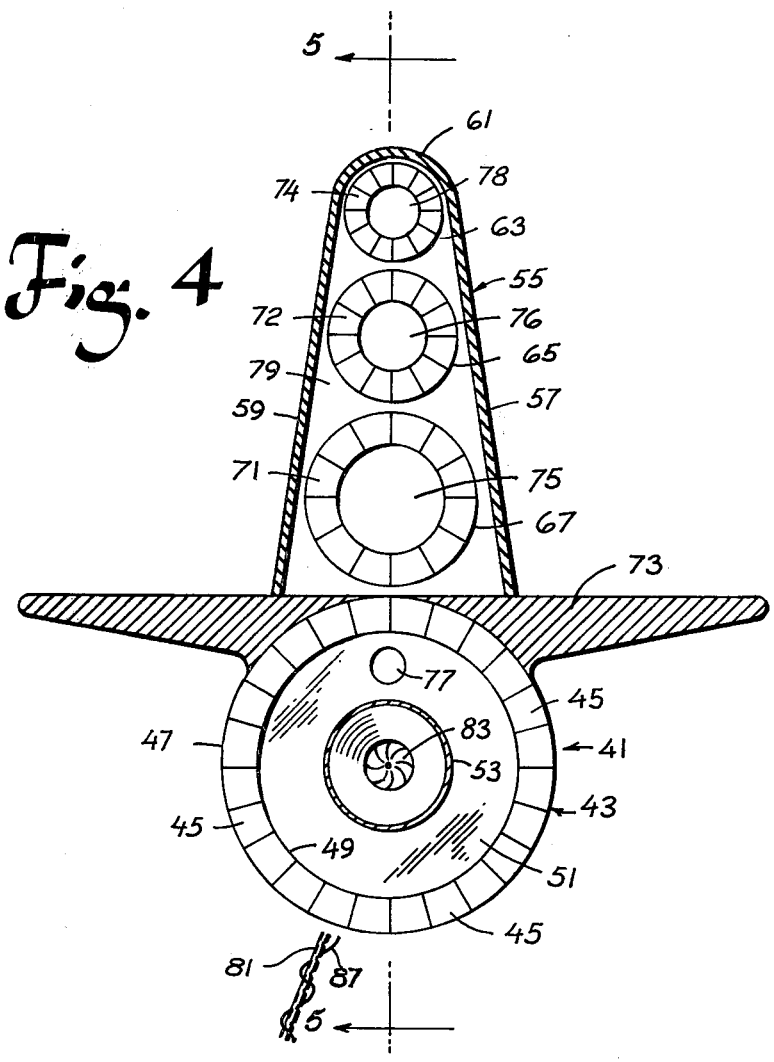
FIG. 4 is a vertical sectional view of a dirigible-wind turbine-electric generator of this invention along planes 4—4, like those of FIG. 5.

A lighter than air dirigible-wind turbine-electric generator 41 is illustrated in FIGS. 4 and 5. Referring first to FIG. 4, a large cylinder 43 is made up of internally pressurized keystones 45 surrounded by sheathing 47 and serving as external walls 49 of vacuum chambers 51, the other wall 53 of which chamber is of sufficient strength to retain its shape despite the force of the vacuum thereon. Cylinder 43 is form-retaining, due at least in part to the effect of the vacuum drawing the component parts inwardly so as to "wedge" them together. The cylinder made is terminated by end plate or disc construction 44. Cylinder 43 is suitably joined to vertical tail member 55 which includes external walls 57 and 59, which meet at top 61 and which walls are reinforced with suitably sized internal light weight form-retaining structures similar to cylinder 43 and the cylinder of FIG. 2, with the ends thereof sealed off, too. Cylindrical structures 63, 65 and 67 are of increasing diameters to match the increasing width of the vertical tail as it approaches cylinder 43. Individual wall members 71, 72 and 74 that compose the cylinders are of different sizes, but can be the same size, with more being employed to form the larger cylinders. The cylinder ends 64, 66 and 67 seal them off and prevent losses of vacuums. Stabilizing horizontal wings or tail structure 73 is provided. Although shown as solid this may also be built around form-retaining light weight cylinders such as those used in the vertical part of the tail. To make the dirigible more buoyant the various wall members 45, 71, 72 and 74 may be filled with a lighter than air gas, such as helium under pressure and the interiors 75, 76 and 78 will be under vacuum, compared to the external atmospheric pressure, with the difference in pressures being sufficient to hold the wall members together or at least to help to hold them together. Vacuum pump 77 is provided which is communicated by lines, not shown, connecting with the vacuum sections of cylinders 43, 63, 65 and 67 so as to allow the control of the degree of vacuum in each such section and regulation of the buoyancy of the dirigible thereby. Valve means, not shown, preferably remotely actuatable, are also provided for individual control of each of the cylinder vacuums. Similar valving, such as shown in FIG. 1, is provided for the pressurized wall members, preferably remotely actuatable, so as to at least partially vent said members to regulate buoyancy. Connecting lines, not illustrated, will also be installed to facilitate inflation and pressurization of said wall members. Means may also be provided to pressurize the space 79 between the tail skins 57, 59 and 61 and form-retaining cylinders 63, 65 and 67 therein.

Tapered internal wall 53 is faced into the wind by a combination action of elevated tail section 55 and tether 81, which is located at a forward end of horizontal cylinder 43. The wind passing between tapered walls 53 of the wind funnel structure is accelerated due to the restriction of the passageway and at high speed passes through gas turbine 83 and drives attached electric generator 85, generating electricity, which passes through a conducting wire, not shown, to conductor 87, associated with tether 81, which conducts the generated electricity to the ground. Of course, various pieces of motor driven auxiliary equipment on the dirigible may be run by motors which are turned by the electricity thus generated.

In FIGS. 6 and 7 is shown a water distillation apparatus 89 which comprises a floating support 91, evaporating section 93, resting on support 91, in which section water is raised from the body of water on which support 91 floats, and in which it is vaporized, and a transporting section 95, through which the vapor is moved to a condenser. Floating support 91 includes floats 97 and 99 and connecting rib 101 or other suitable tying structure. The floating support is buoyant enough so that the upper surfaces thereof are above water level 103. Water 102 is raised in evaporating section 93 to a sufficient height 107 in the transparent walled evaporating section so that the sun may shine on such elevated water and evaporate it. Component wall portions 105, which may be keystone-shaped and filled with pressurized gas or may be of other form-retaining structure below level 107, will be held together by more than the difference between atmospheric pressure and the internal vacuum in section 93 below level 107 because of the pressure exerted by the height of water but above the maximum height to which the water may rise keystones 105 or corresponding parts of other shapes may be maintained in position by the difference between the internal vacuum of the distillation apparatus and the external atmospheric pressure. Thus, keystones 109 may be held in semi-circular cross-sectional configuration about a horizontal axis by such pressure difference, as may be keystones 111 in cylindrical transporting section 95. In FIG. 6 there is shown support 113, resting on ground surface 117 and attaching means 115 for supporting transporting section 95. Of course a plurality of such supports may be employed and they may be replaced by guy wires.

In the distillation apparatus shown sea water is raised by vacuum, such as the vacuum of condensation of the water vapor previously generated, into evaporating section 93, which may be a transparent walled tank or may include a plurality of relatively thin tubes, such as flat tubes, in which the water may be raised. The water is relatively confined in evaporating section 93 so that it does not mix back with the sea water or pond water from which it was lifted and thereby helps to hold any heat from the sun's rays directed onto it through the transparent outer walls of the evaporating section. To promote heating of the water in evaporating section 93 sorbent means may be included therein, such as black bodies, preferably near the vertical axis of the evaporating section but alternatively, to promote evaporation, the water may be dyed, preferably black. Because the elevated water is relatively confined in evaporating section 93, is heated by solar radiation and is under vacuum, it readily vaporizes at the upper surface thereof and moves upwardly and then horizontally through transporting section 95. In such section, with its light weight vacuum maintained construction, sorbent means may also be provided to obtain heat from the sun for heating of the gas moving through the transporting section. Such gas is preferably communicated with a condenser via the transporting section but may first pass through a gas turbine which powers an electric generator or other motive device. The low absolute pressure at condensation of the water vapor maintains the quick flow of water vapor through section 95, assists in boiling off water in the evaporating section 93 and helps to raise water from a body thereof into such evaporating section. Thus, a light weight means is provided for distilling water and obtaining electricity or mechanical power at the same time, with the vacuum of condensation helping to maintain the structure, especially the transporting section, in desired position and simultaneously elevating water into the evaporating section of the apparatus.

Various materials of construction suitable for making the basic wall member have been referred to previously but the list thereof is not to be limited to those specifically mentioned. Any suitable material capable of being made in thin normally flexible or elastomeric form and capable of resisting the internal pressure employed may be utilized although sometimes it is preferable for the material to be transparent, translucent or opaque. Furthermore, although somewhat flexible frame members are preferred in the wall members, if used, they may also be somewhat rigidified, and may be made of metals or plastics which are not as flexible as would be desired for the major wall surfaces of the wall members. Certain glasses are even useful as framing materials and sometimes may also be employed for the wall surfaces. Among preferred materials are neoprene, buna and SBR rubbers, polyethylene, polyvinyl chloride and polyvinylidene chloride. Combinations of materials may also be employed, such as rubber coated or polyurethane-coated cottons, polyesters, nylons and other fibrous materials.

The internal pressure employed in the wall members will normally be kept comparatively low, in the interest of reducing the weight of the light weight structure when that is desirable. Thus, normally such pressures will be from 1.1 to 10 atmospheres, preferably from 2 to 5 atmospheres and more preferably 1.5 to 3 atmospheres but higher and lower pressures may also be employed so long as they are in excess of those external to the invented structure. Thus, when the external pressure, as in a high altitude dirigible or "balloon", is as low as 75 mm. Hg abs., the internal wall member pressure may be as low as 0.2 atmospheres (sea level atmospheres). The vacuum external to the wall members and (usually) internal of the structure formed by them will be such that the external atmospheric pressure will act to press the wall members together, usually inwardly with respect to the structure, helping to hold them together and to seal off the structure. The difference between the external atmospheric pressure and the internal absolute pressure of vacuum for the described and preferred structures will usually be at least 50 mm. Hg and may be as high as about 750 mm. Hg. The normally desirable range is from 200 to 700 mm. Hg, e.g., about 550 mm. Hg. Of course, in some applications it may be possible to raise the external pressure so as to increase such differences even further.

Although the interior of the wall member is normally hollow, it may be filled with a sponge-like material such as a synthetic organic polymeric plastic foam, e.g., open-celled polyurethane foam, which may be compressed or expanded, as desired. Such foam can help to form the wall members into desired final shape but is usually not employed because of its additional weight.

The thicknesses of the thin wall members and their sizes depend somewhat on their volumes and on the particular applications intended for them. When making a vacuum insulated enclosure about a pipe or pipe-like structure, the wall members may include volumes as small as 100 milliliters but for the formation of dirigible walls and similar large scale applications they may be as large as 400 liters. Normally such volumes will be in the range of 1 to 100 liters, e.g., about 5 liters. The wall member thicknesses (those of the normally flexible or elastomeric materials) will usually be in the range of 0.1 mm. to 1 cm. (the upper figure being for very large structures) but generally will be from 0.1 mm. to 2 mm. Framing thicknesses, when framing is used, will ordinarily run from 0.5 mm. to 2 cm., preferably being from 0.5 mm. to 5 mm.

The wall members made are essentially form-retaining at the particular internal pressure employed (the degree of vacuum and the external or atmospheric pressure usually have relatively little influence on the wall member form). By "essentially form-retaining" it is meant that the wall member will maintain its normal form, with minor flexings or changes being possible in response to pressures. Thus, the sides may flex up to 10%, usually up to 5%, to better conform to the sides of similar contacting members. However, it is also within the invention to utilize pressurized wall members which are absolutely form-retaining and which are held to other such members by close fitting, sheathing or cementing. Especially desirable structures are those which do not require additional framing about the wall member surface and in which the component thin material thereof is normally continuous. Suitable cements include the rubber cements, the cyanoacrylates and the urethanes but others may also be used.

The various end members and spacers utilized in the structures of this invention may be made from materials previously described and may also be of wall member-like component parts held together by the difference between the external pressure on them and the vacuum in the interior of the structure. The invented structures may be modified so as to utilize pressure interiorly thereof instead of vacuum, in which case, unless there is a special interlock provided as previously discussed, the employment of an external sleeve or similar means to prevent the wall members from separating is desirable.

In the application of the present invention which involve providing vacuum insulation about a pipe, the word pipe is intended to be inclusive of tubes, hoses, ducts and various other "closed" passageways. The presence of vacuum about the pipe prevents transfer of heat to it and from it by convection and conduction, except by the spacers and of course, the spacers will preferably be made of an essentially non-conductive material, such as a synthetic organic polymeric plastic. Radiation of heat to and from the pipe may be limited by silvering or aluminizing the pipe and the wall member walls to reflect heat back to its source.

In the lighter than air aircraft aspect of the invention, wherein light weight vacuum maintained structural parts of the aircraft, as represented by a dirigible, are integral components thereof, both vacuum and the lighter than air gas utilized to pressurize the wall members aid in maintaining the buoyancy of the aircraft. Such is regulatable by use of a vacuum pump or a compressor communicated to the interior of the structure and/or to the wall members thereof, allowing weight control of the vessel, rather than volume control, to maintain its buoyancy. In a modification of the dirigible, wherein it includes funnel tapered wall means internally of the major buoyant vacuum maintained cylinder, the taper will normally be between 0.5° and 5°, preferably 1° to 2°. To obtain a desirable increase in wind velocity the ratio of the cross-section of the funnel at the open end to such cross-section at the more restricted end will usually be in the range of 4:1 to 100:1, preferably 5:1 to 50:1. The cross-section of the funnel will usually be circular but may be of other shapes such as regular polygons. Instead of a single gas turbine at the restricted end of the funnel a plurality of such turbines and a plurality of generators connected to them may be employed. The electricity generated may be transmitted to the ground by a separate conductor, as illustrted, or the guy wire and the conductor may be the same.

The solar distillation apparatus of FIGS. 6 and 7 is normally located sea-side and produces fresh water from salt water or brackish water and transports it to a desired terminal or point of use, after generation of electricity. However, the apparatus may be employed solely for the generation of electricity, solely for the transportation of water or solely to distill and thereby purify sea water or other salt-containing waters. While it is preferred that the apparatus be mounted on a pair of buoyant barges, connected as illustrated, it may be mounted on other floating means or may be supported on the sea or pool bottom or by towers or piles mounted thereon. Alternatively, the entire unit may be buoyant, due to the use of helium or, with certain safety precautions, hydrogen, to make it lighter than air and may be held down by guy wires which replace support 113 and are also placed in additional positions on the distillation apparatus to maintain it level and at desired height.

In addition to the three applications of the vacuum maintained structures of this invention given it will be apparent that various other apparatuses may also be made including them. Thus, they may be fashioned into roofs and walls for buildings, floats, balloons, tents, canopies and tanks and have various insulating applications too, shaped as cylinders, spheres, etc.

Although the principal advantage of the vacuum maintained light weight structures at the heart of the invention is that they may be made with relatively little material, thereby being energy- and material-conserving, and lend themselves to applications requiring insulation and/or lighter than air structures, other advantages are in their comparatively low expensive, ease of assembly and erection and capability of being readily disassembled and transported to other locations for reassembly and use. The piping insulation made is light weight, yet effective. The funnel dirigible has the capability of generating huge quantities of electricity from the wind in the sizes contemplated, which may include a funnel having an opening of 5 to 10 meters in diameter, narrowing to from 1 to 5 meters over a length of from 30 to 250 meters. A plurality of such dirigible-wind turbine-electric generators may be utilized together, normally being set apart several hundred meters, and the electricity generated may be delivered to the ground or to high towers on the ground through a common conductor for further transmission to consumption points. The water distillation appartus can quickly transfer huge volumes of water long distances for little cost and of course, can simultaneously evaporate and purify such volumes of water and generate significant quantities of electricity. Usually excellent operation takes place when the lift of the water above "sea level" is at least five meters, preferably 7 to 10.5 meters but lesser raisings are also useful, e.g., 2 to 4 meters. Under good operating conditions the pressure in the apparatus will be no greater than 350 mm. Hg absolute and preferably this will be from 10 to 250 mm. Hg abs. Nevertheless, useful operation can occur at vacuums which correspond to absolute pressures of about 400 to 600 mm. Hg.

The invention has been described with respect to various illustrations of preferred embodiments thereof but is not to be limited to these because it is evident that substitutes and equivalents for various components thereof may be utilized and various modifications may be made therein without departing from the spirit of the invention.

What is claimed is:

1. A light weight vacuum maintained hollow cylindrical structure comprising: a plurality of separate walled hollow members, the walls of said members being of thin, normally flexible material, which members are internally gas pressurized so as to have such gas apply forces against interiors of the walls thereof to press them outwardly and maintain the members in desired form, the members being positioned with respect to each other, with walls of adjacent hollow members being in contact with each other, to form a cylinder; means for sealing off the ends of the cylinder under an internal pressure which is less than an external pressure on the hollow cylindrical structure so that the separate walled hollow members are held together by the external pressure to help seal off the hollow interior of such structure; and gas in the interior of the cylindrical structure and gas external to such structure, with the pressure in the interior being less than atmospheric and that external to the structure being greater than that in the structure interior.

2. A structure according to claim 1 in which the separate wall members are of keystone-like shape.

3. A structure according to claim 1 which includes an internal pipe passing longitudinally through the cylinder and in which the means for sealing off the ends of the cylinder are closures at the ends of the cylinder through which closures the pipe passes and to which it is joined in a vacuum-tight relationship, such closures being so located that they are held against end keystone-shaped hollow members by external pressure, said pressure being atmospheric, so as to seal off the interior of the structure between said hollow members and the pipe and to maintain said interior under vacuum.

4. A structure according to claim 2 wherein the keystone-shaped parts are of a material selected from the group consisting of rubbers, synthetic organic polymeric plastics, metals, metal alloys and gas-tight fabrics, are in the cross-sectional shape of a circumferential partial sector of a circle and are internally pressurized with a gas selected from the group consisting of helium, nitrogen and air.

5. A structure according to claim 4 which includes means for connection to the hollow interior of the cylinder of vacuum means for drawing a vacuum in the cylinder interior and in which the keystone-shaped members include valves for maintaining gas pressure therein and for addition and removal of such gas.

* * * * *